(12) United States Patent
Nakajima et al.

(10) Patent No.: US 6,581,658 B2
(45) Date of Patent: Jun. 24, 2003

(54) METHOD OF CORRECTING TIRE UNBALANCE

(75) Inventors: Tokuzo Nakajima, Kobe (JP); Hiroyuki Kobayashi, Kobe (JP); Naoki Yukawa, Kobe (JP); Masami Nishikawa, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 10/020,159

(22) Filed: Dec. 18, 2001

(65) Prior Publication Data

US 2002/0124921 A1 Sep. 12, 2002

(30) Foreign Application Priority Data

Dec. 26, 2000 (JP) .......................... 2000-395460

(51) Int. Cl.[7] .............. B60C 5/00; B60C 19/00; B60C 5/12; B29D 30/06

(52) U.S. Cl. .................... 152/154.1; 156/75; 156/110.1
(58) Field of Search ................. 152/154.1; 156/75, 156/110.1

(56) References Cited

U.S. PATENT DOCUMENTS

| 2,193,734 A | * | 3/1940 | MacCracken ............... 156/75 |
| 3,987,833 A | * | 10/1976 | Powell et al. ............ 152/154.1 |
| 2002/0059971 A1 | * | 5/2002 | Yukawa et al. ........... 152/209.2 |

* cited by examiner

*Primary Examiner*—Adrienne C. Johnstone
(74) *Attorney, Agent, or Firm*—Birch, Stewart, Kolasch & Birch, LLP

(57) ABSTRACT

A method for correcting dynamic unbalance of a pneumatic tire which comprises adhering a counter weight to an inner surface of the tire to reduce dynamic unbalance of the tire, wherein the counter weight is made of a material having a specific gravity in a range of from 0.016 to 0.21 such as a strip of a spongy material.

3 Claims, 4 Drawing Sheets

METHOD OF CORRECTING TIRE UNBALANCE

BACKGROUND OF THE INVENTION

The present invention relates to a method of correcting dynamic unbalance of a tire.

In general, a pneumatic tire has dynamic unbalance more or less. If a tire having a heavier part is rotatably supported with its rotational axis kept horizontally, the heavier part probably comes down. Such a tire can be said as being in a statically unbalanced state. Although a tire is statically balanced, a precessional motion is sometimes observed when the tire is rotated at a high speed. Such a tire can be said as being in a couple-unbalanced state. The dynamic unbalance includes such static unbalance and couple unbalance.

Conventionally, dynamic unbalance of a wheel, here which means an assembly of a tire and a wheel rim, is corrected by fixing a counter weight made of lead or brass to the flange of the wheel rim. Thus, the tire itself is not improved in the dynamic unbalance. Accordingly, if the tire is remounted or the wheel rim is replaced with another, the wheel must be balanced again.

In the laid-open japanese patent application JP-A-7-113715, a counter weight fixed to the inner surface of a tire is disclosed, wherein the counter weight is a heavy paste containing metal powder having a high specific gravity. Thus, during high speed running, a centrifugal force of the counter weight concentrates on a narrow region of the tire inner surface to lift up this region, and the tread portion is partially deformed to increase the radial force variation.

SUMMARY OF THE INVENTION

An object of the present invention is to provide a method of correcting dynamic unbalance of a pneumatic tire it self, by which the radial force variation is not increased.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
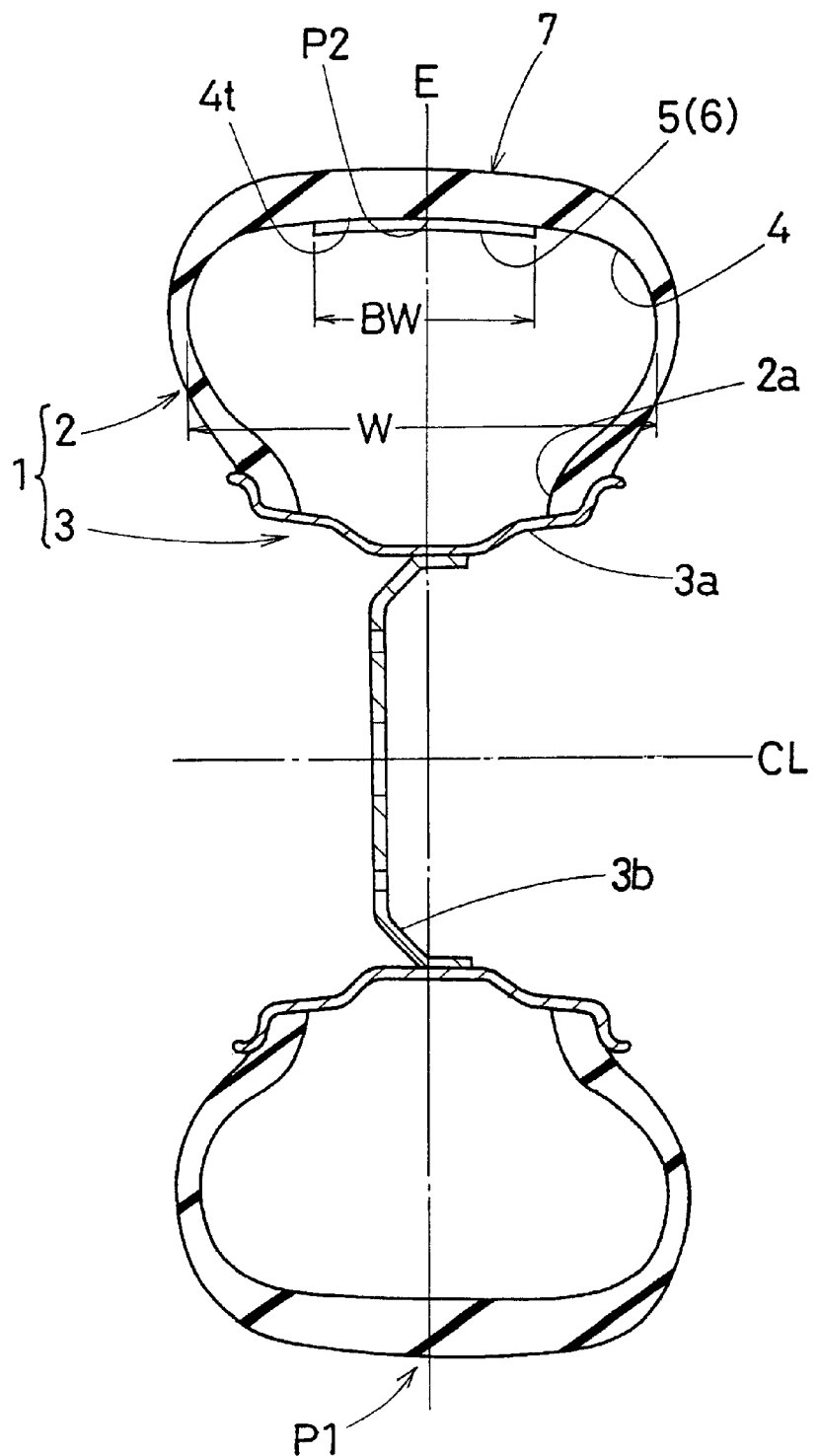
FIG. 1 is a schematic meridian sectional view of a pneumatic tire according to the present invention.
Figure 2:
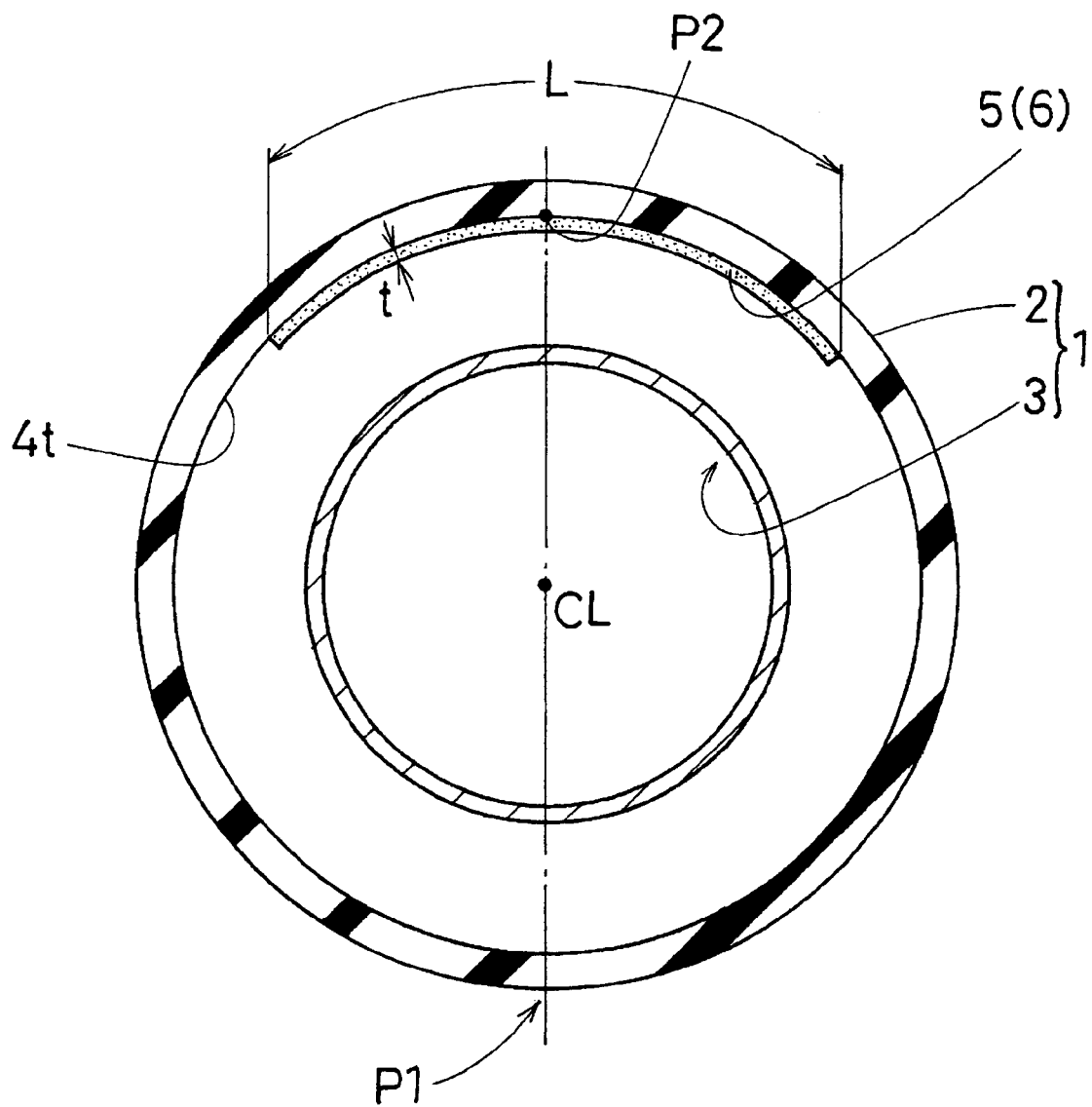
FIG. 2 is a schematic cross sectional view of the pneumatic tire taken along the tire equator.

In FIG. 1, pneumatic tire 2 according to the present invention is mounted on a rim 3a of a wheel 3. The wheel 3 comprises the rim 3a and a disk 3b for fixing to the vehicle's axle. The wheel rim 3a comprises a pair of bead seats and a pair of flanges. The pneumatic tire 2 is composed of a tread portion 7, sidewall portions and bead portions which continue in a toroidal shape. The tire 2 is, for example, a tubeless radial tire for passenger cars provided with an inner liner made of an air-impermeable rubber compound which covers the inner surface 4 of the tire.

In order to reduce dynamic unbalance of the tire 2, the tire is provided on the inner surface 4 with a weight 5 made of a material having a low specific gravity.

The weight 5 is made from a strip of a spongy material 6 which can be easily bent and deformed. Preferably, open-cell or closed-cell porous materials formed by foaming rubber, synthetic resin or the like are used as the spongy material 6. Further, it is also possible to use fibrous material formed by intertwining fibers such as synthetic fibers, animal fibers and vegetable fibers. In this example, polyurethane sponge is used.

The counter weight 5 is bonded to the tire inner surface 4 preferably the inner surface 4t of the tread portion 7 as shown in FIG. 1 by means of adhesive agent, adhesive double coated tape or the like.

As the shape of the counter weight, a rectangle long in the circumferential direction of the tire is used in this example. But, other shapes such as oval, square and the like may be used.

Figure 3:
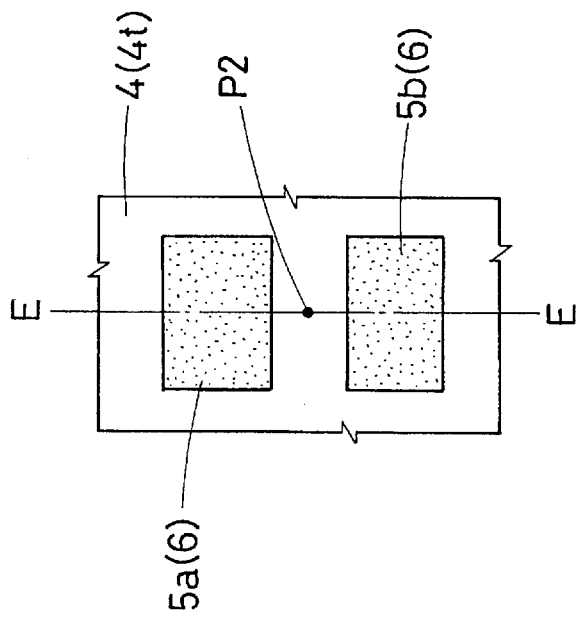
FIGS. 3 to 7 are developed views each showing an example of the arrangement of the counter weight on the tire inner surface.

In FIG. 3, the center of the counter weight 5 in the longitudinal and widthwise directions thereof is positioned at a counter position P2, while aligning the longitudinal direction thereof with the tire circumferential direction.

The specific gravity is set in a range of from 0.016 to 0.21, preferably from 0.016 to 0.06. By setting the specific gravity at such a low value, the volume of the counter weight 5 becomes relatively large and it extends over a relatively wide range of the tire inner surface 4. Thus, a concentration of the mass of the counter weight 5 can be avoided, whereby the tread portion is prevented from being partially deformed by the centrifugal force and an excessive increase in RFV can be prevented.

If the specific gravity is lower than 0.016, a volume necessary for balancing the tire becomes too large, and the mass is dispersed in a wide space. As a result, it becomes difficult to counter the unbalance. If the specific gravity is more than 0.21, the RFV during high speed running is liable to increase.

Although the sizes of the spongy material 6 are determined based on the mass required for correcting the unbalance, the specific gravity of the spongy material 6 and tire size, it is preferable that the sizes satisfy the following conditions.

The thickness (t) of the spongy material is set in a range of from 2 to 60 mm, preferably 3 to 40 mm, more preferably 3 to 20 mm. If the thickness (t) is less than 2 mm, it is difficult to correct the unbalance. If the thickness (t) is more then 60 mm, the RFV is liable to increase during high speed running.

The width BW of the spongy material is set in a range of not less than 15%, preferably 30 to 100%, more preferably 30 to 80% of the maximum width W of the tire inner surface 4 in a normally inflated unloaded state of the tire. If the width BW is less than 15% of the maximum width W, as the circumferential length is increased, it becomes difficult to correct the unbalance. If the width BW is more than 100% of the maximum width W, as the spongy material 6 reaches to a tire sidewall part subjected to a large bending deformation, it becomes difficult to maintain the adhesive strength.

The circumferential length L of the counter weight 5 is set in a range of not less than 200 mm, preferably not less than 250 mm, more preferably from 250 to 1000 mm.

Here, the above-mentioned normally inflated unloaded state is such that the tire is mounted on a standard rim and inflated to a standard load but loaded with no tire load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 200 kPa is used as the standard pressure. The standard load is the "maximum load capacity" in JATMA, the "Load capacity" in ETRTO, the maximum value given in the above-mentioned table in TRA or the like.

FIGS. 4 to 7 show other examples in which a plurality of weights are used. The above-mentioned dimensional limitations are also applied to these examples.

Figure 4:
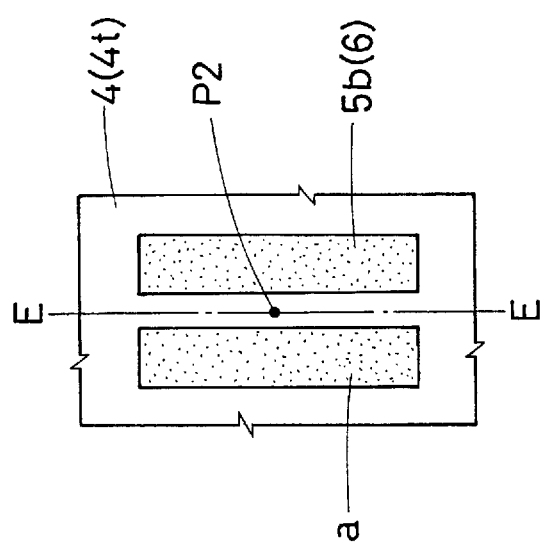

In FIG. 4, two weights 5a and 5b having the same size are disposed one on each side of the tire equatorial plane E. These positions are substantially symmetrical with respect to the tire equatorial plane E, and the centers in the longitudinal direction of the two weights 5a and 5b are positioned at the same circumferential position of the counter position P2.

Figure 5:
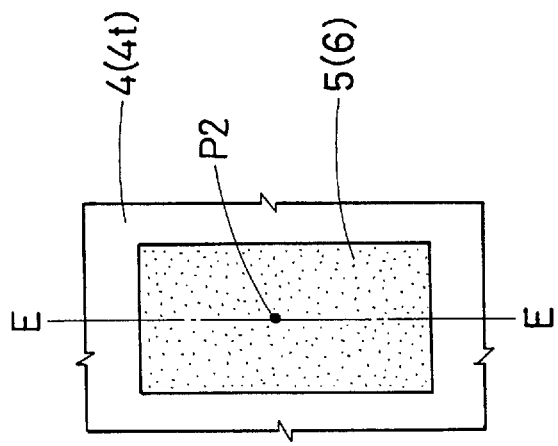

In FIG. 5, two weights 5a and 5b are disposed one on each side of the counter position P2 in the tire circumferential direction. These positions are substantially symmetrical with respect to an axial line passing through the counter position P2, and the centers in the widthwise direction of the two weights 5a and 5b are positioned at the same axial position of the counter position P2.

In FIGS. 4 and 5, the total mass of the two weights 5a and 5b is substantially equal to the unbalance amount, namely, that in the single weight case shown in FIG. 3.

The above-mentioned arrangements may be preferably used when the couple-unbalance is relatively small.

Figure 7:
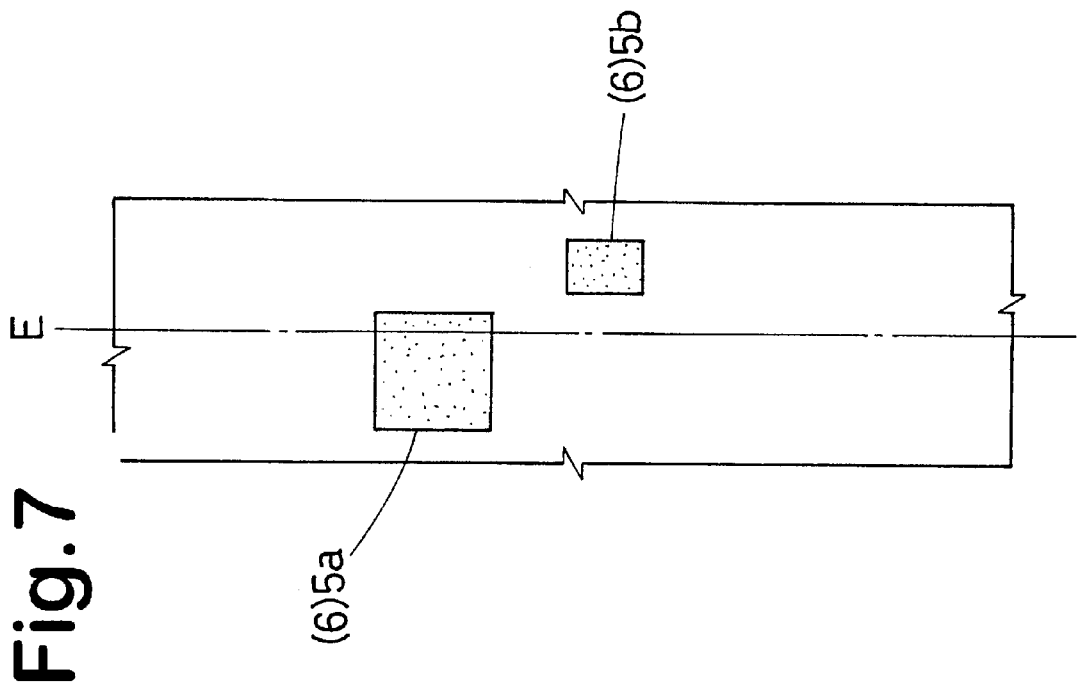
Figure 6:
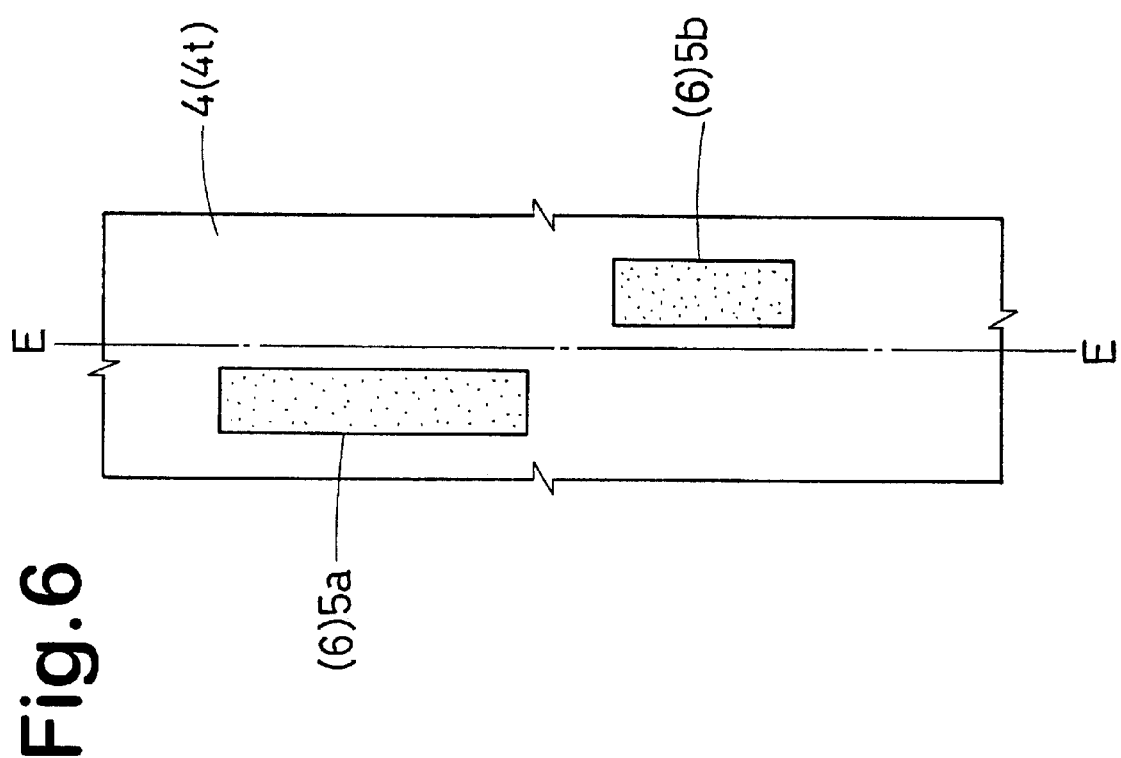

In FIGS. 6 and 7, two weights 5a and 5b are used, but in order to reduce the couple-unbalance as well as the static unbalance, their positions are made asymmetrical unlike FIGS. 4 and 5.

The above-mentioned counter position P2 may be that in the sense of static unbalance, namely, a counter position to the heaviest position P1 of the tire with respect to the tire rotational axis CL. Also the counter position P2 may be that in the sense of couple unbalance. The counter position P2 may be found, for example, utilizing a tire balancer. The value of the counter weight 5 is determined for a position on the tire inner surface 4, for example, the inside 4t of the tread portion 7, not a position on the rim flange.

Comparison Tests

Using a radial tire of size 195/65R15 91s (rim size 15×6jj) for passenger cars, the radial force variation, working property and noise reducing power were evaluated by changing the specifications of the counter weight as shown in Table 1.

Radial Force Variation Test

The radial force variation was measured according to Japanese JASO-C607 (a method for testing uniformity of an automobile tire). As the radial force variation (RFV), the difference of the balanced state from the unbalance state was obtained and is indicated by an index based on the prior art being 100, wherein the smaller the index number, the better the RFV.

Noise Reducing Power Test

A Japanese passenger car provided on all the wheels with test tires was run on a noise measuring road (an asphalt rough road) at a speed of 60 km/h, and an inside-car noise was measured near the driver's ear at three channels of 226, 240 and 254 Hz through a $1/12$ octave band filter. In Table 1, the difference in the noise sound level in dB(A) from the prior art is shown. (inner pressure 200 kPa)

Working Property Test

A working property in adhering the counter weight was evaluated into ten ranks, wherein the higher the rank number, the better the working property.

The test results are shown in Table 1.

TABLE 1

| Tire | Prior | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|---|
| Counter weight | | | | | | | | | | | | | | | | |
| Material | *1 | *2 | *2 | *2 | *2 | *2 | *2 | *2 | *2 | *2 | *2 | *2 | *2 | *2 | *2 | *2 |
| Specific gravity | 1.2 | 0.01 | 0.03 | 0.06 | 0.21 | 0.21 | 0.21 | 0.03 | 0.03 | 0.03 | 0.03 | 0.03 | 0.03 | 0.03 | 0.03 | 0.03 |
| Thickness (mm) | 4 | 6 | 5 | 5 | 5 | 5 | 5 | 5 | 5 | 5 | 5 | 5 | 5 | 5 | 5 | 5 |
| Width (mm) | 100 | 20 | 20 | 20 | 10 | 2 | 3 | 60 | 40 | 40 | 40 | 20 | 20 | 20 | 10 | 10 |
| Length (mm) | 45 | 100 | 100 | 100 | 100 | 100 | 100 | 100 | 150 | 30 | 60 | 150 | 170 | 120 | 100 | 60 |
| Mass (g) | 21.6 | 650 | 300 | 180 | 100 | 500 | 320 | 100 | 150 | 500 | 250 | 200 | 180 | 250 | 600 | 1000 |
| RFV | 100 | 20.8 | 21 | 21.6 | 21 | 21 | 20.2 | 21 | 21 | 21 | 21 | 21 | 21.4 | 21 | 21 | 21 |
| Working property | 10 | 10 | 30 | 60 | 80 | 10 | 30 | 80 | 70 | 10 | 40 | 50 | 60 | 40 | 10 | 10 |
| Noise dB(A) | 0 | 2 | 7 | 8 | 9 | 5 | 7 | 9 | 9 | 5 | 8 | 8 | 7 | 8 | 3 | 1 |
| | | — | −3.5 | — | — | — | — | — | −1 | — | — | −2.3 | — | −3 | −3.7 | −3.2 |

*1) Rubber
*2) Polyurethane sponge
*3) The counter weights were fixed using an adhesive agent.
*4) The maximum width of the tire inner cavity in the normally inflated unloaded state was 185 mm.

From the test results, it was confirmed that Example tires can be improved in the RFV. Further, the road noise can be reduced because the counter weight absorbs the sound energy.

As described above, in the present invention, the low specific gravity material is used. Thus, the volume of the counter weight increases, which enables the mass to spread over a relatively wide range of the tire inner surface. Accordingly, the centrifugal force of the counter weight during high speed running is dispersed and the radial force variation, vibration during running and the like are effectively improved.

What is claimed is:

1. A method for correcting dynamic unbalance of a pneumatic tire comprising adhering a counter weight to an inner surface of the tire to reduce dynamic unbalance of the tire, wherein the counter weight is made of a material having a specific gravity in a range of from 0.016 to 0.21.

2. A method for correcting dynamic unbalance of a pneumatic tire according to claim 1, wherein said counter weight is a strip of a spongy material having a specific gravity in a range of from 0.016 to 0.06.

3. A pneumatic tire comprising a tread portion, sidewall portions and bead portions which continue in a toroidal shape defining the inner surface of the tire, and a weight for correcting tire dynamic unbalance which is made of a material having a specific gravity in a range of from 0.016 to 0.21 and adhered to the inner surface of the tire.

* * * * *